No. 824,097. PATENTED JUNE 26, 1906.
L. G. DANIELS & W. B. KIRKPATRICK.
CAR COUPLING.
APPLICATION FILED FEB. 23, 1906.

2 SHEETS—SHEET 1.

Witnesses

Inventors
Landis G. Daniels and
William B. Kirkpatrick

By
Attorneys

No. 824,097. PATENTED JUNE 26, 1906.
L. G. DANIELS & W. B. KIRKPATRICK.
CAR COUPLING.
APPLICATION FILED FEB. 23, 1906.
2 SHEETS—SHEET 2.
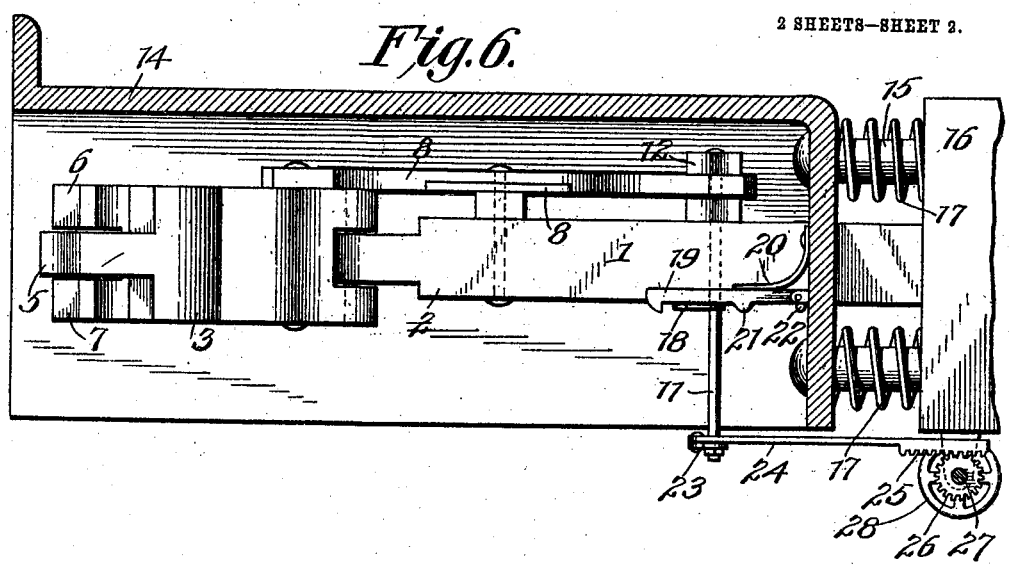
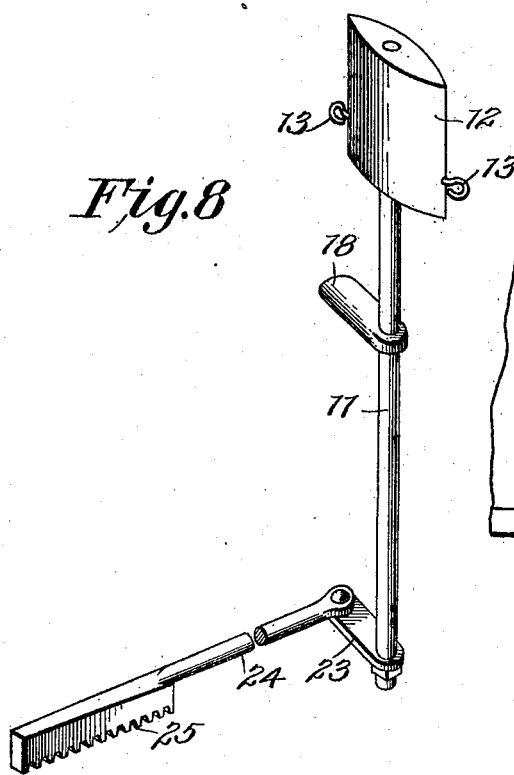
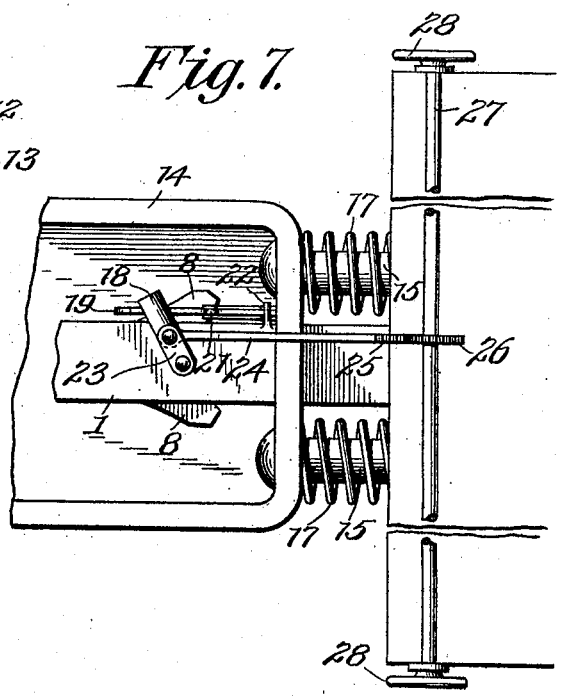
Inventors,
Landis G. Daniels and
William B. Kirkpatrick
Witnesses

UNITED STATES PATENT OFFICE.

LANDIS G. DANIELS AND WILLIAM B. KIRKPATRICK, OF HIGH SPIRE, PENNSYLVANIA.

CAR-COUPLING.

No. 824,097.      Specification of Letters Patent.      Patented June 26, 1906.

Application filed February 23, 1906. Serial No. 302,586.

*To all whom it may concern:*

Be it known that we, LANDIS G. DANIELS and WILLIAM B. KIRKPATRICK, citizens of the United States, residing at High Spire, in the county of Dauphin and State of Pennsylvania, have invented certain new and useful Improvements in Car-Couplers; and we do hereby declare the following to be a full, clear, and exact description of the invention, such as will enable others skilled in the art to which it appertains to make and use the same.

Our invention relates to new and useful improvements in car-couplers, and relates more particularly to the class of automatic couplers.

Our object is to provide a device which will be positive in its operation, cheap in construction, and one that may be automatically or manually secured together.

Other objects and advantages will be hereinafter referred to, and pointed out in the claims.

In the accompanying drawings, which are made a part of this application, we have shown the preferred form of our invention.

Figure 1:
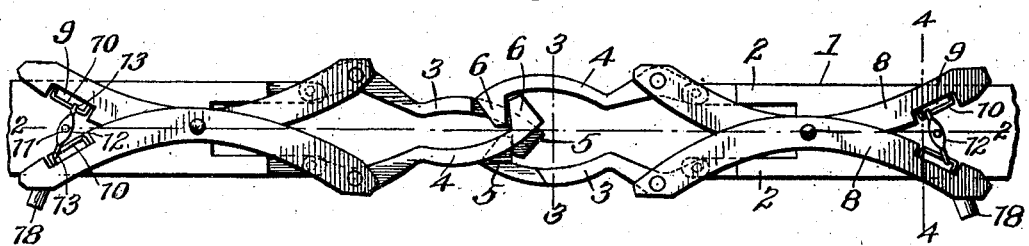
Figure 2:
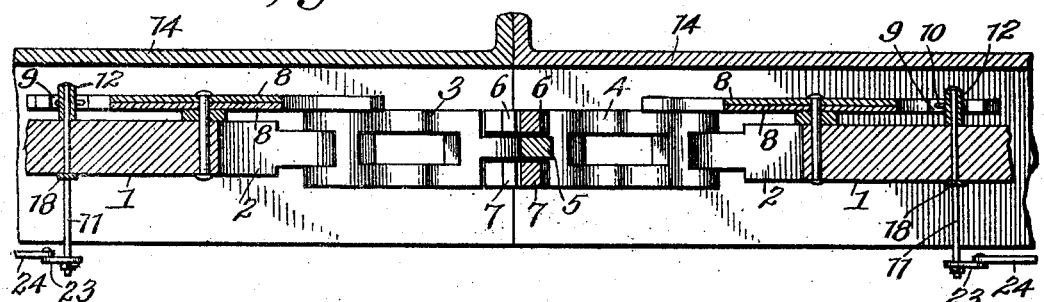
Figure 3:
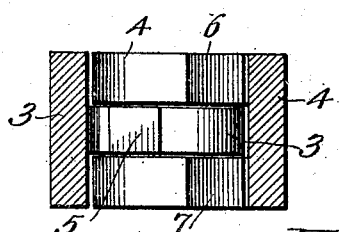
Figure 4:
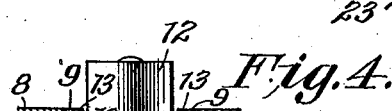
Figure 5:
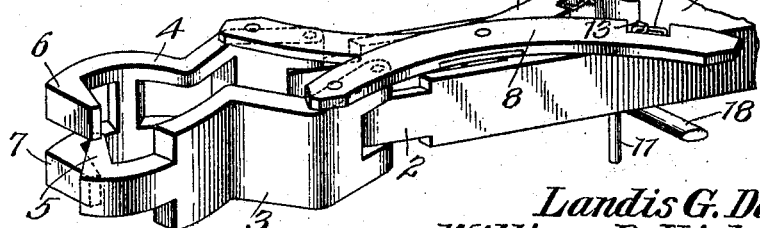

In said drawings, Figure 1 is a plan view of a pair of draw-bars or couplers interlocked with each other with the housings thereof removed. Fig. 2 is a longitudinal sectional view thereof as seen from line 2 2, Fig. 1, and showing the housing thereon. Figs. 3 and 4 are sectional views as seen from the lines 3 3 and 4 4, respectively, of Fig. 1. Fig. 5 is a perspective view of one of the draw-bars or couplers. Fig. 6 is an enlarged detail view of one of the couplers, showing the housing thereof in section. Fig. 7 is a detail bottom plan view of a portion of the draw-bar and housing therefor, and Fig. 8 is a detail perspective view of the automatic coupling mechanism removed from the draw-bar.

Referring to the figures by numerals of reference, 1 indicates the draw-bar proper, which is rigidly secured in any preferred manner to the end of the car-body, the free end of said draw-bar having arms 2, to the free ends of which are pivotally secured locking-arms 3 and 4. The outer end of the locking-arm 3 is provided with a single knuckle 5, while the arm 4 is provided with a pair of knuckles 6 and 7.

Pivotally secured to the upper side of the draw-bar 1 are scissors-like controlling-arms 8, one end of said arms being secured, respectively, to the locking-arms 3 and 4, while the opposite ends of said arms are provided with seats or cut-away portions 9, in which are disposed elongated staples 10.

Extending vertically through the draw-bar 1 is a rod 11, to the upper end of which is secured a controlling member 12, said member having eyebolts 13 secured thereto, the looped ends of which are adapted to engage and slide upon the elongated staples 1.

Disposed over the draw-bar 1 is a channel-shaped housing 14, said housing having its lower side and outer end open and is secured to the body of the car, as by supporting-rods 15, one end of which is secured to the body of the car 16, while the opposite end passes through the closed end of the housing 14 and is headed to hold said housing thereon. The housing 14 also serves as a bumper, whereby the jar incident to the coupling of the car is compensated for, a spring 17 being disposed around the rods 15 between the end of the car-body and the housing 14, it being understood that the housing 14 is longitudinally movable upon said rods.

Rigidly secured to the rod 11 immediately below the draw-bar 1 is a lever 18, said lever projecting beyond the edge of said draw-bar and designed to be engaged by a latch-arm 19, which is pivotally mounted upon the end of the housing 14. A spring 20 is disposed above said latch-arm and directs pressure thereon, whereby said latch is held in operative position at all times. By this construction it will be seen that when the housings or bumpers come together said housings will be moved toward the car-body and the latch 19 will engage the lever 18 and rotate the bar 11 and controlling member 12, thus directing locking-arms 3 and 4 into engagement with similar locking-arms on the opposite draw-bar. When the housing 14 is moved inwardly sufficiently to draw the locking members 3 and 4 into engagement with the locking members of the opposite draw-bar, a projection 21 on the lower side of the latch 19 will contact a lug 22, carried by the draw-bar, and raise said latch out of engagement with the lever 18, so that when it is desired to uncouple the draw-bars the lever 18 will be left free to move into its original position.

Secured to the elongated lower end of the rod 11 is a lever 23, to which is secured an arm 24, said arm having at its inner end a rack-bar 25, which engages a pinion 26, carried by a bar 27, which in turn is mounted on the under side of the car-body 16. The bar 27 projects from each side of the car-body and is provided on its outer ends with handwheels 28, whereby when it is desired to uncouple the car said hand-wheels are rotated and the locking-arms 3 and 4 disengaged through the medium of the levers 8 and the controlling member 12.

In operation the arms 3 and 4 upon one of the draw-bars are drawn together and the knuckles upon one arm disposed past the knuckles upon the opposite arm. The arms 3 and 4 of the opposite draw-bar being open, the knuckles thereon will be disposed in engagement and interlock with the knuckles upon the closed draw-bar when the cars are impelled against each other.

As best shown in Fig. 1, the two knuckles 5 interlock with each other, while the knuckles 6 and 7 are interlocked with each other, said knuckles being so arranged that they will compensate for any curvature of the track, and are held positively interlocked with each other through the medium of the arms 8 and controlling members 12. It will also be seen that the curved arm 3 upon one coupler is oppositely disposed to the arm 3 of the other coupler, so that if the cars should be turned end for end the locking-arms 3 and 4 will be in position to interlock with each other.

What we claim is—

1. The herein-described car-coupler comprising a draw-bar; locking-arms pivotally secured to one end thereof, knuckles carried by the outer ends of said arms, controlling-arms for said locking-arms, a rod extending through said draw-bar, a controlling member upon the upper end thereof and connected to the controlling-arms, a controlling-lever secured to said rod, a housing for said draw-bar, and means carried thereby to engage the lever and operate the locking-arms.

2. A car-coupler of the class described comprising a draw-bar, locking-arms pivotally secured thereto, controlling-levers for said arms, a controlling member operatively connected to said levers, a rod carrying said controlling member, and means connected to the lower end of said rod whereby said rod and controlling member may be manually operated to operate the locking-arms.

3. A car-coupler of the class described comprising the combination with a draw-bar having locking-arms at one end thereof and means to operate said locking-arms; of a housing for said draw-bar and arms, supporting-rods secured to the car-body and extending through one end of the housing, and springs around said rods between the housing and car-body.

4. In a car-coupler, the combination with the body of a car; of a draw-bar therefor, means carried at one end of said draw-bar to interlock the same with the adjoining draw-bar, a housing for said draw-bar, supporting-rods secured to the car-body and extending through openings in one end of said housing, springs disposed around said rods and between the car-body and housing and means carried by the housing to operate said interlocking means.

5. In a car-coupler, the combination with a draw-bar having interlocking members at one end; of a housing for said draw-bar and interlocking members, and means carried by said housing to automatically operate said locking members.

6. A car-coupler having interlocking members at one end, levers to operate said interlocking members, a controlling member secured to said levers, a rod to control said member, a housing for said draw-bar, a latch carried by said housing, a projection on said latch, a lever secured to said rod, and means carried by the draw-bar to disengage said latch from said lever.

In testimony whereof we have signed our names to this specification in the presence of two subscribing witnesses.

LANDIS G. DANIELS.
WILLIAM B. KIRKPATRICK.

Witnesses:
A. B. SMITH,
PETER KEMPF.